Jan. 1, 1963 H. FISCHER 3,071,710
COAXIAL TRANSMISSION LINE WITH SPACED CAPACITANCE
CONTROL OF PULSE GENERATION
Filed May 26, 1960 2 Sheets-Sheet 1

INVENTOR.
HEINZ FISCHER
BY Wade Koontz and
Martin J. Finnegan
ATTORNEYS

INVENTOR.
HEINZ FISCHER
BY Wade Koontz
Martin J. Finnegan
ATTORNEYS

United States Patent Office 3,071,710

Patented Jan. 1, 1963

3,071,710

COAXIAL TRANSMISSION LINE WITH SPACED CAPACITANCE CONTROL OF PULSE GENERATION

Heinz Fischer, 32 Scott Road, Belmont, Mass.

Filed May 26, 1960, Ser. No. 32,060
8 Claims. (Cl. 315—39)
(Granted under Title 35, U.S. Code (1952), sec. 266)

The invention described herein may be manufactured and used by or for the United States Government for governmental purposes without payment to me of any royalty thereon.

This invention relates to the generation of electrical energy in the form of a pulse of high amplitude, with ultra-rapid rise to such high amplitude, and suitable for switching, signaling, and cycle-triggering purposes in high-intensity coaxial transmission lines or other coaxial circuitry. This application is a continuation-in-part of my application No. 724,775 filed March 28, 1958.

In my Patents 2,728,877; 2,900,566; and 2,911,567 I have disclosed methods and apparatus for generating electrical pulses of extremely high temperature, extremely intense brilliance, and extremely rapid rise to peak amplitude, following discharge of energy previously stored in a capacitor assembly having coaxial relationship to pulse-forming elements of the apparatus. My copending application No. 724,775 illustrates pulse-forming elements establishing a spark gap at the central axis of a coaxial transmission line, and featuring intimacy and directness in the method of transferring current from the capacitor parts to the spark gap-defining electrode elements. The present application proposes the provision of an annular conductivity gap surrounding the coaxial conductors and separating said conductors from the surrounding capacitance elements, thereby interposing a dielectric barrier of selected break-down value, to establish a desired degree of high-voltage build-up prior to formation of the electrical pulse across the gap, the effect being to tend to match the impedance characteristics of the coaxial conductors receiving the discharge energy of the capacitor, thus tending to stabilize the pulse operation by eliminating unwanted transient current oscillations and insuring development of a pulse of predetermined amplitude and shape, in accordance with the selected impedance-resistance-capacitance relationships.

The accompanying drawings will further aid in understanding the invention principles wherein.

Figure 1:
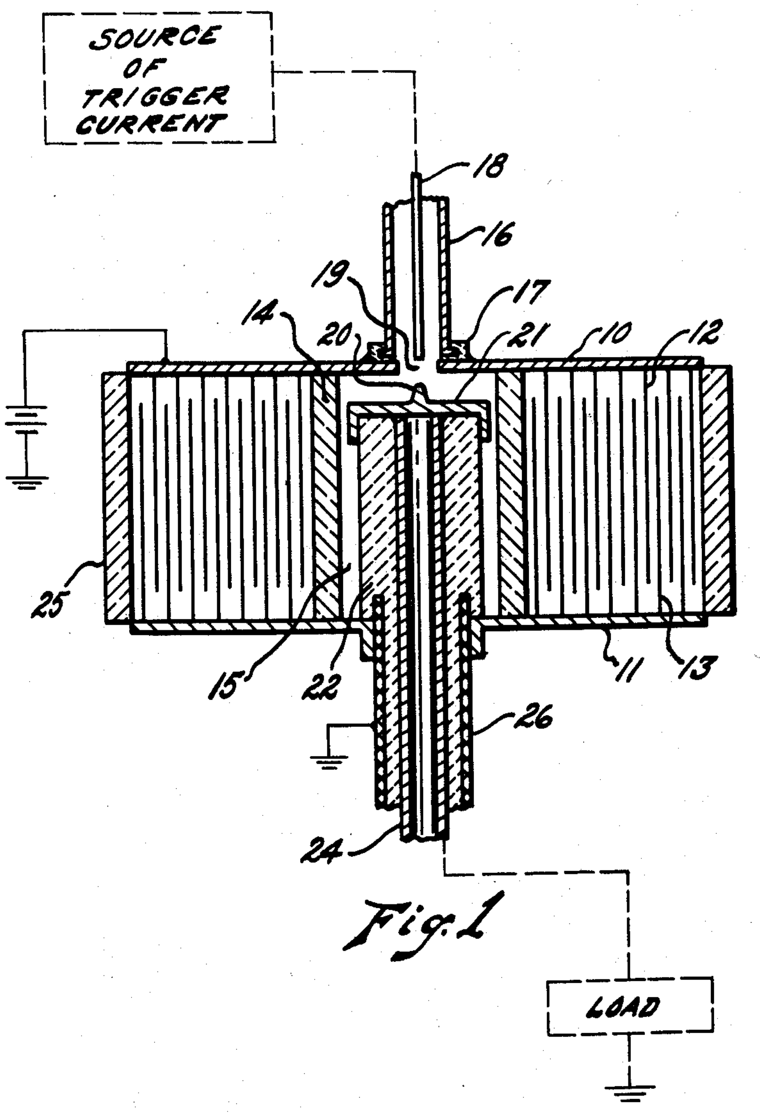
FIG. 1 is a schematic cross-sectional view of an annular barrier type embodiment of the invention.

Referring first to FIG. 1, the capacitor portion of the assembly includes a pair of flat metallic discs 10 and 11, to which are secured the upper and lower edges, respectively, of alternate strips 12, 13 of metal foil that are spirally wound—along with an inter-leaving strip of insulating material such as paper—about a spool 14 of dielectric material. A similar dielectric spool 25 surrounds the assembly. The coaxial conductive portion of the assembly includes an outer tubular conductor 16 having a terminal collar 17 of insulating material integrated with disc 10, and an inner conductor in multiple parts including, first, a trigger current-receiving rod or wire 18 terminating just short of the central tip 20 of a metallic disc 21 constituting the conductive cap of the main portion 24 of the inner conductor, which is sheathed in insulator 22, the latter being spaced from spool 14 to leave an annular gap 15 between elements 22 and 14, the width of which is so chosen as to establish a matching relationship with the impedance characteristic of the coaxial line, including the electrode gap 19 immediately above tip 20. The outer conductive part 26 of the line is integral with disc 11, as indicated.

By using "Teflon," barium titante, mica, or equivalent material of high dielectric strength for insulator 22, it is possible to form this insulator 22 of extremely thin sheet material thus reducing the inductance-impedance factors to values of smaller magnitudes than have heretofore been available.

Figures 2, 3:
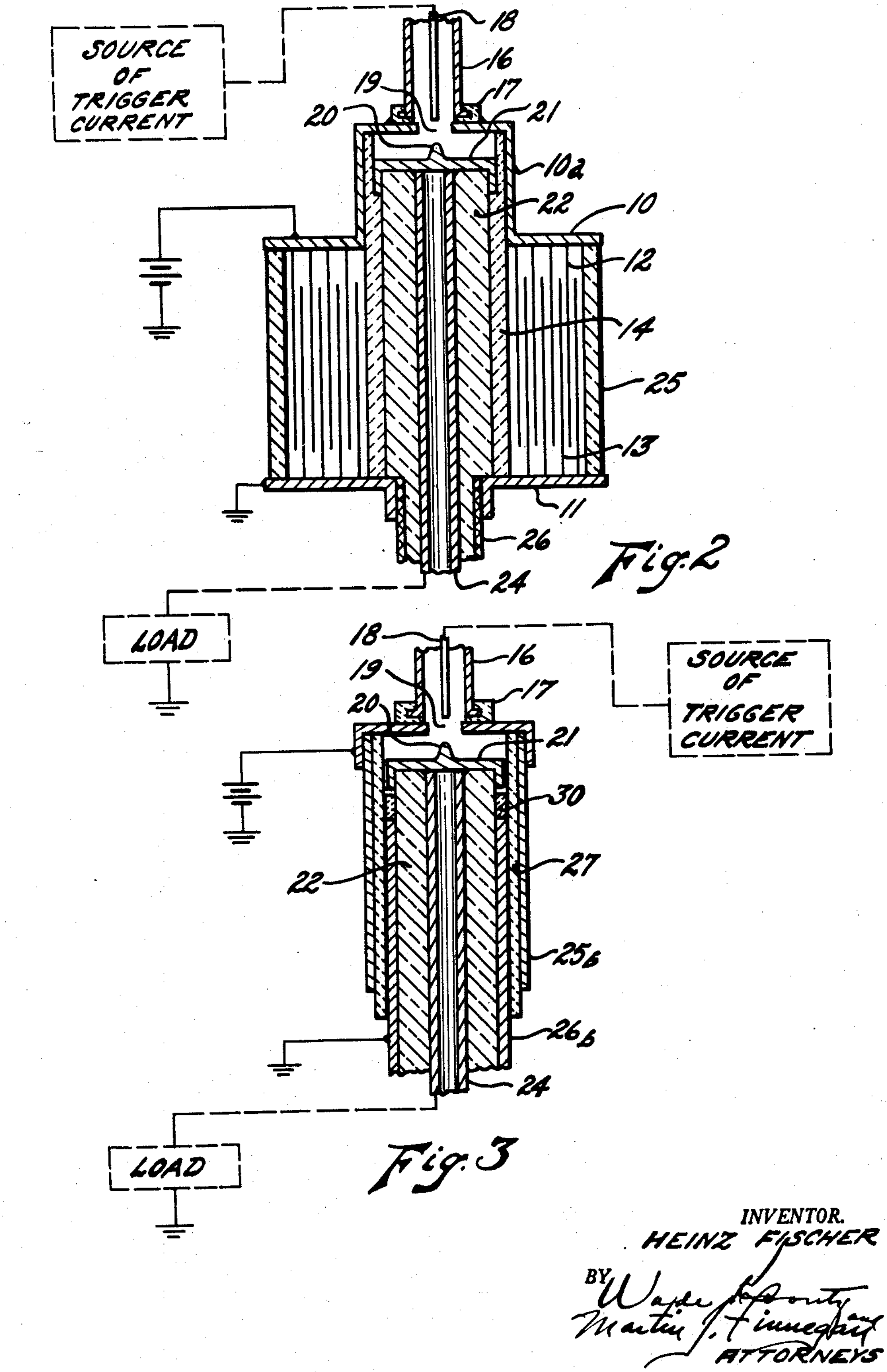
FIG. 2 is a schematic cross-sectional view of an annular barrier type extended line and multi-layer capacitor as a second embodiment of the invention.
FIG. 3 is a schematic cross-sectional view of an annular barrier type single layer capacitor as a further embodiment of the invention.

FIG. 2 embodies the principles above-described as included in FIG. 1, except that the central elements are extended axially to position gap 19 substantially above the plane of terminal 10; also the over-all diameter of the capacitor is reduced, and the annular gap 15 of FIG. 1 is eleminated; that is, insulating sheath 22 fits closely within spool 14, so that spool 14 is the sole dielectric barrier between cap 21 and the extension **10*a* of disc 10**.

FIG. 3 also embodies the same principle, utilizing a single layer of Teflon or the like, as at 27, which coacts with conductive elements **25*b* and 26*b* to form the energy storage unit of the capacitor, thus serving the function of the multi-layer storage units 12, 13 of FIGS. 1 and 2, and also serving, with spacer 30, as the dielectric barrier between cap 21 and capacitor terminal 10**. By use of this single-layer arrangement, "streamlining" of the assembly may be accomplished.

The D.C. power supply for charging the capacitor elements preferably has a potential of at least 50 kilovolts, and may be of substantially greater voltage potentiality, dependent upon the degree of heat and light pulse intensity to be achieved at the spark gap 19 (whose dimension may be on the order of 0.25 to 1 cm.) and also, of course, dependent upon the energy storing capacity and storing time cycle of the capacitor elements as well as upon the nature of the work to be accomplished at the "load" point of the transmission line—for example, infra-red signalling, the initiation of nuclear or analogous reactions, the melting of refractory substances, vaporization of metals, or related high temperature operations.

What I claim is:

1. The combination of a high-capacity storage unit including conductive elements separated by dielectric material and wound about a coaxial transmission line having a pulse-forming gap in its inner conductor, and impedance-matched dielectric barrier means electrically connecting one of the storage unit conductive elements to said transmission line gap, to control the pulse stability.

2. In a capacitance assembly, a hollow spool of dielectric material, a pair of sheets of electrically conductive material and an intervening sheet of dielectric material wound about said spool, a flat metallic disc joined to one edge of one of said conductive sheets, said disc having a centrally disposed area lying within the circumference of said spool, a dielectric barrier of known resistivity disposed coaxially of said spool, said dielectric barrier having one of end surfaces abutting the centrally disposed area of said disc, and coaxially disposed transmission means abutting the other end surface of said dielectric barrier to receive the energy previously stored in said wound sheets on each capacitance-discharging operation.

3. In a capacitance assembly, a hollow spool of dielectric material, a pair of sheets of electrically conductive material and an intervening sheet of dielectric material wound about said spool, a flat metallic disc joined to one edge of one of said conductive sheets, said disc having a centrally disposed area lying within the circumference of said spool, a dielectric barrier of known resistivity disposed coaxially of said spool, said dielectric barrier having one of end surfaces abutting the centrally disposed area of said disc, coaxially disposed transmission means abutting the other end surface of said dielectric barrier to receive the energy previously stored in said wound sheets on each capacitance-discharging operation, and means electrically connecting with the other of said conductive sheets for triggering each capacitance-discharging operation.

4. In a capacitance assembly, a hollow spool of dielectric material, a pair of sheets of electrically conductive material and an intervening sheet of dielectric material wound about said spool, a flat metallic disc joined to one edge of one of said conductive sheets, said disc having a centrally disposed area lying within the circumference of said spool, a dielectric barrier of known resistivity disposed coaxially of said spool, said dielectric barrier having one of end surfaces abutting the centrally disposed area of said disc, coaxially disposed transmission means abutting the other end surface of said dielectric barrier to receive the energy previously stored in said wound sheets on each capacitance-discharging operation, and means electrically connecting with the other of said conductive sheets for triggering each capacitance-discharging operation, said triggering means including a coaxial section of transmission line having its outer conductor terminating in a flat metallic disc joined to said other of said conductive sheets, and having its inner conductor terminating in pulse-forming gap relationship to said first-named transmission means.

5. In a capacitance assembly, a pair of flat metallic discs enclosing a current storing capacitance unit, a dielectric barrier of known resistivity, said dielectric barrier having one of its end surfaces abutting one of said discs, and transmission means coaxial with said dielectric barrier for receiving energy from said capacitance unit on each capacitance-discharging operation.

6. An assembly as defined in claim 5, including means electrically connecting with the other of said discs for triggering each capacitance-discharging operation.

7. An assembly as defined in claim 6, wherein said triggering means includes a conductor having pulse-forming gap relationship to said coaxial transmission means.

8. An assembly as defined in claim 6, wherein said triggering means is disposed in a plane substantially spaced beyond the confining planes of said metallic discs, to escape the effect of the major portion of the magnetic field circulating in the region confined by said discs.

References Cited in the file of this patent

UNITED STATES PATENTS

| | | |
|---|---|---|
| 2,171,219 | Malter | Aug. 29, 1939 |
| 2,270,953 | Manz et al. | Jan. 27, 1942 |
| 2,728,877 | Fischer | Dec. 27, 1955 |
| 2,900,566 | Fischer | Aug. 18, 1959 |
| 2,911,567 | Fischer | Nov. 3, 1959 |